Figure 1:
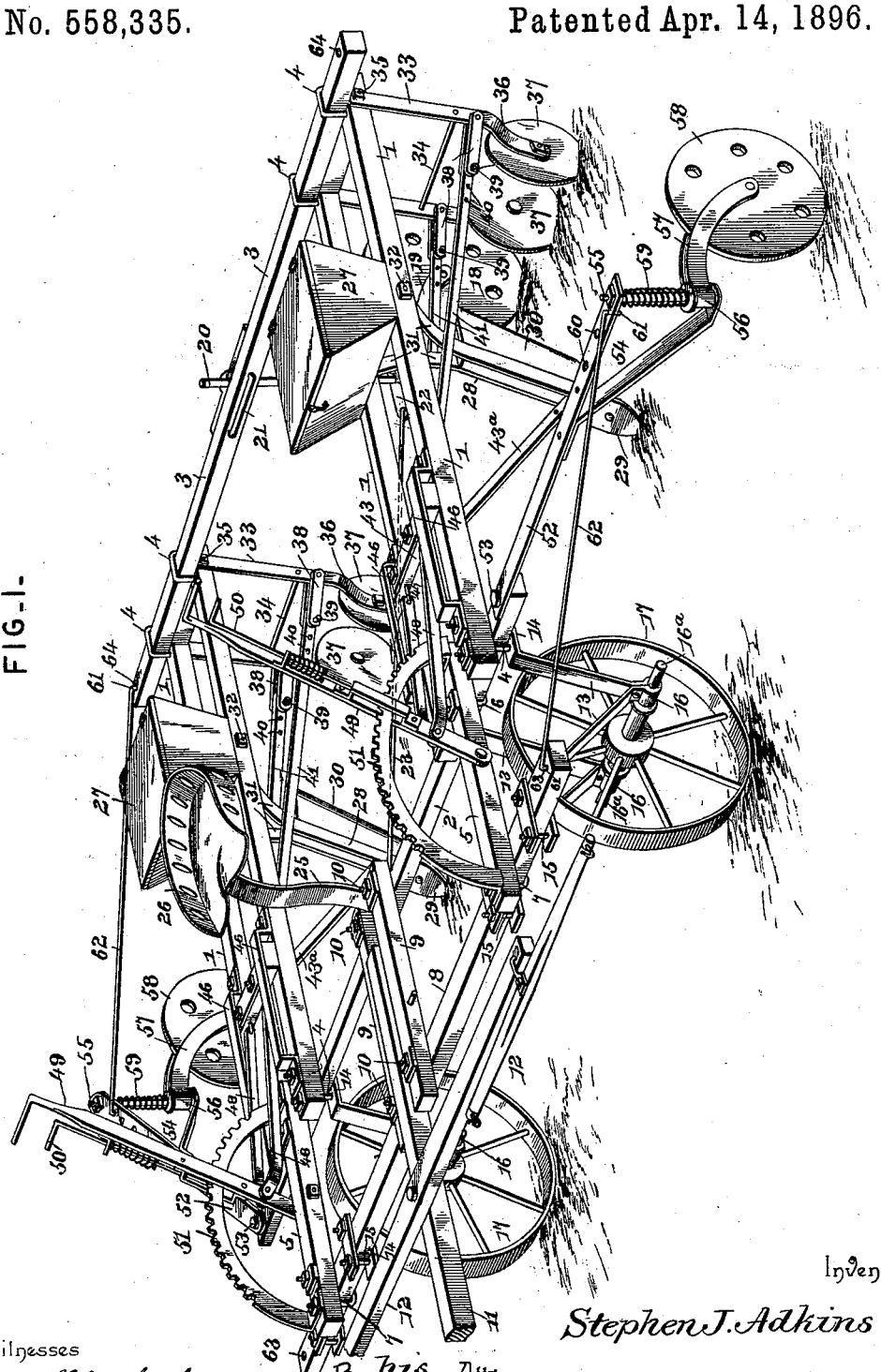

(No Model.) 3 Sheets—Sheet 1.

S. J. ADKINS.
SEED PLANTER ATTACHMENT.

No. 558,335. Patented Apr. 14, 1896.

Witnesses
Jas. K. McCathran
D. P. Wolhaupter

Inventor
Stephen J. Adkins
By his Attorneys,
C. A. Snow & Co.

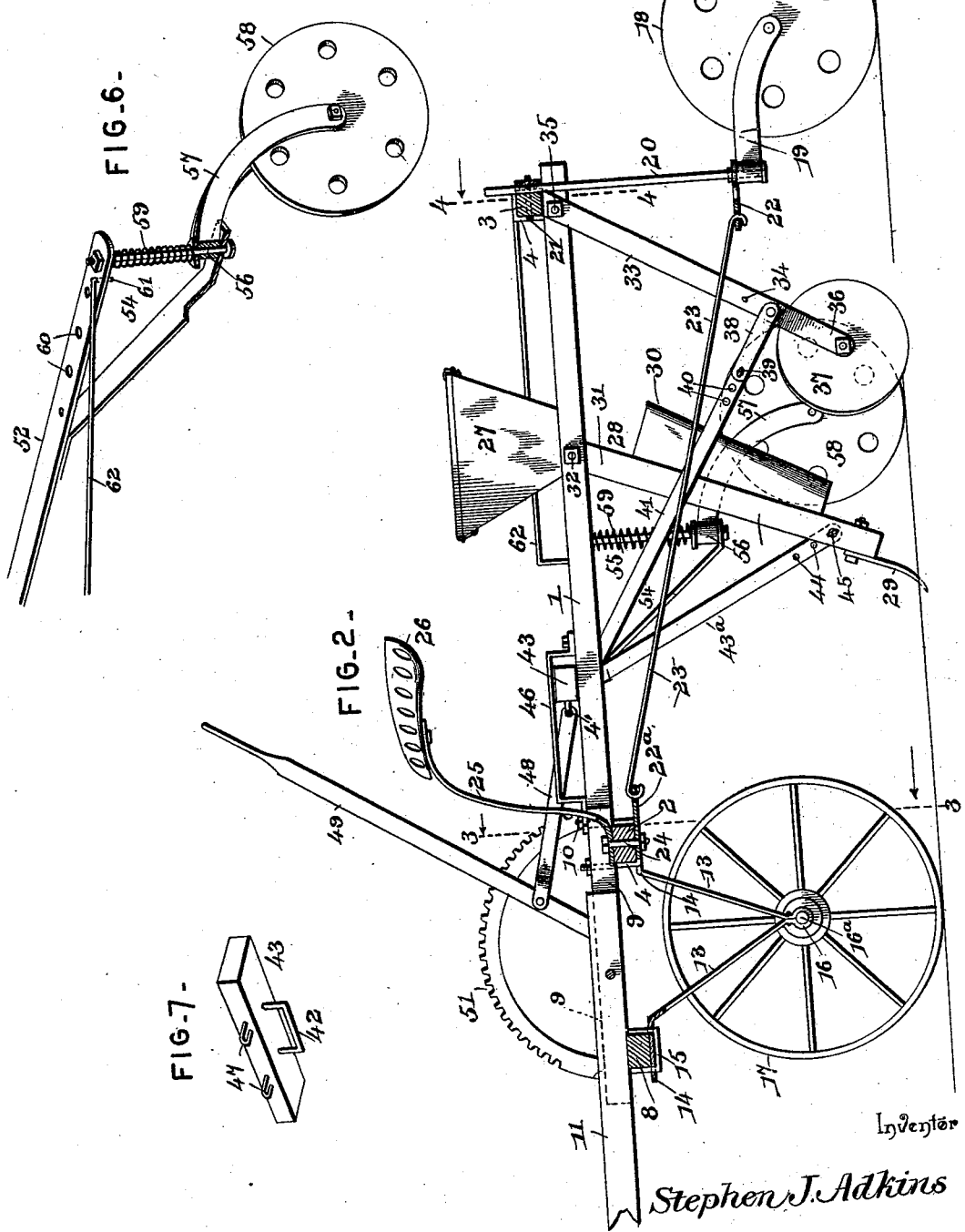

(No Model.) 3 Sheets—Sheet 3.
S. J. ADKINS.
SEED PLANTER ATTACHMENT.
No. 558,335. Patented Apr. 14, 1896.
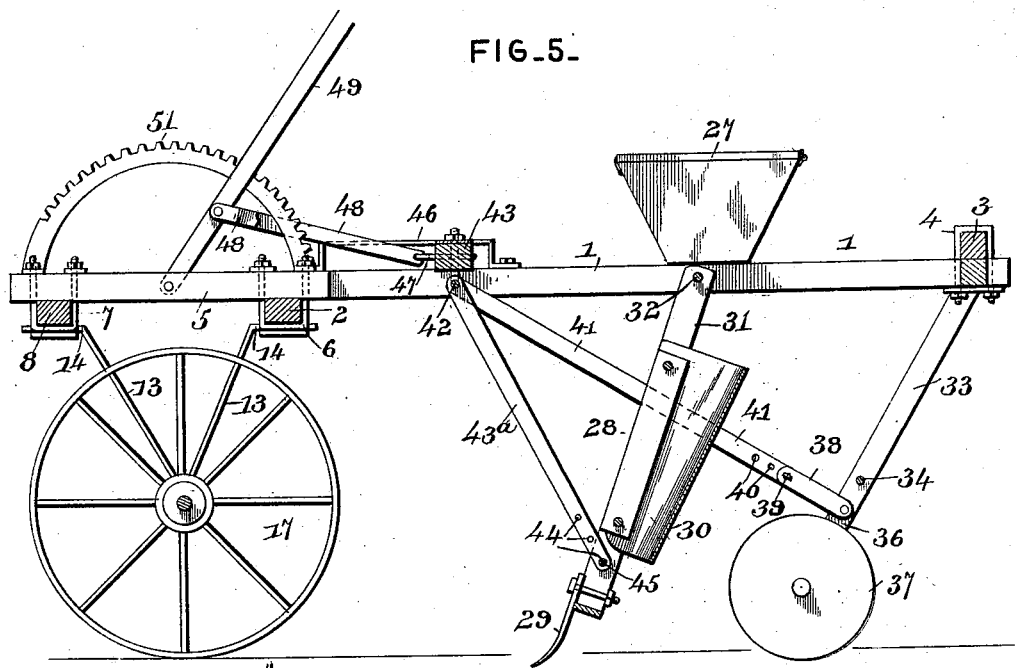
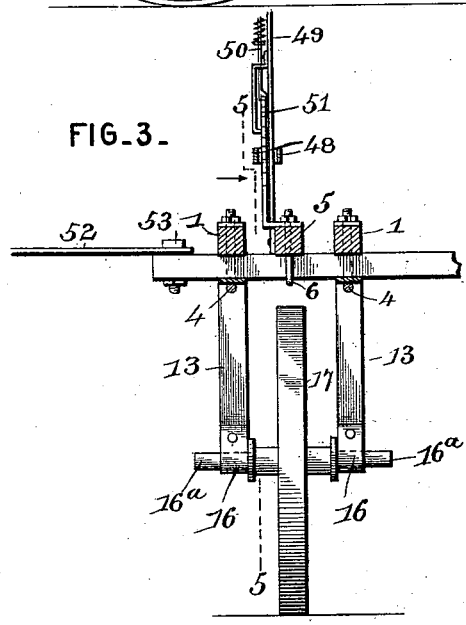
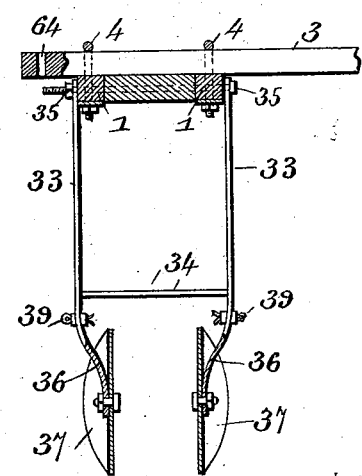
Witnesses
Jas. K. McCathran
D. P. Wolhaupter
Inventor
Stephen J. Adkins
By his Attorneys,
C A Snow & Co.

UNITED STATES PATENT OFFICE.

STEPHEN J. ADKINS, OF COVINGTON, TEXAS, ASSIGNOR TO ROBERT N. HILL, OF GRAND VIEW, TEXAS.

SEED-PLANTER ATTACHMENT.

SPECIFICATION forming part of Letters Patent No. 558,335, dated April 14, 1896.

Application filed September 28, 1895. Serial No. 564,012. (No model.)

*To all whom it may concern:*

Be it known that I, STEPHEN J. ADKINS, a citizen of the United States, residing at Covington, in the county of Hill and State of Texas, have invented a new and useful Seed-Planter Attachment, of which the following is a specification.

This invention relates to seed-planter attachments; and it has for its object to provide a new and useful machine of this character adapted to simultaneously plant two rows of corn, cotton, or other seed at any desired distance apart and to also provide means for marking the third row at any width from the planter.

To this end the invention primarily contemplates certain improvements in the construction of machine set forth in my former patent, No. 487,941, dated December 13, 1892, whereby the said machine can be more readily and easily adjusted and manipulated to accomplish the planting of a field with corn, cotton, or other seed.

With these and other objects in view, which will readily appear as the nature of the invention is better understood, the same consists in the novel construction, combination, and arrangement of parts hereinafter more fully described, illustrated, and claimed.

In the drawings, Figure 1 is a perspective view of a seed-planting machine constructed in accordance with this invention. Fig. 2 is a central vertical longitudinal sectional view thereof. Fig. 3 is a transverse sectional view on the line 3 3 of Fig. 2. Fig. 4 is a similar view on the line 4 4 of Fig. 2. Fig. 5 is a longitudinal sectional view on the line 5 5 of Fig. 3. Fig. 6 is a detail in perspective, partly in section, of one of the adjustable marker attachments for the machine. Fig. 7 is a detail in perspective of one of the sliding crossheads.

Referring to the accompanying drawings, 1 1 designate opposite pairs of transversely-adjustable side bars or beams that are connected at their opposite ends to the front and rear transverse frame-bars 2 and 3, respectively, by means of the U-shaped clip-bolts 4, engaging the front and rear extremities of the side bars 1 and embracing the transverse frame-bars 2 and 3, thereby providing a connection between the side frame bars or beams and the transverse frame-bars, whereby the opposite pairs of side frame bars or beams can be adjusted transversely to vary the distance therebetween according to the width of rows being planted, and also providing means whereby it is simply necessary to loosen the U-shaped clip-bolts in order to take the machine apart, thereby avoiding the trouble and annoyance of entirely removing bolts in adjusting or taking the machine apart.

Front extension-bars 5 are extended from the front transverse frame-bar 2 from between the side bars or beams 1 of each pair, and said front extension-bars 5 are adjustably connected at their rear ends to the transverse bar 2 by means of U-shaped clip-bolts 6, and are adjustably connected at their front ends by similar bolts 7 to the transverse draft-bar 8, arranged in front of and parallel with the front transverse frame-bar 2. At a point intermediate of their ends the parallel bars 2 and 8 support thereon a pair of cleats 9, that are detachably bolted at their ends by means of ordinary bolts 10 to the bars 2 and 8, and are adapted to pivotally receive therebetween the inner end of the draft-tongue 11, that carries the usual doubletree 12, to which the draft-animals are hitched for carrying the planter over the field.

Opposite pairs of depending V-shaped bearing-brackets 13 are arranged under the opposite ends of the front transverse bars 2 and and 8. The depending V-shaped bearing-brackets 13 of each pair are spaced from each other and are provided with upper flanged ends 14, and the rear upper flanged ends of the brackets 13 of each pair are adjustably bolted to the under side of the front transverse frame-bar 2 by means of the U-shaped clip-bolts 4, that adjustably connect the front ends of the side bars or beams 1 to the bar 2. The front upper flanged ends 14 of the brackets 13 of each pair are adjustably bolted to the under side of the front draft-bar 8 by means of separate U-shaped clip-bolts 15, and it is to be observed at this point that all of the connections thus far described, except for the cleats 9, consist of U-shaped clip-bolts, whereby the necessary transverse adjustment of the side bars or beams 1, and the parts used in connection therewith, may be secured, while at the same time admitting of a ready separation and assembling of the parts of the machine.

The depending V-shaped bearing-brackets 13 of each pair are provided at their apices or lower ends with bearing-collars 16, that receive the spindle extremities 16ª of the front spoked wheels 17, that provide for supporting the front end of the machine, and may also be employed in connection with any suitable cov-dropping mechanism for operating the same when the machine is employed in connection with special mechanism for dropping the seed. The rear end of the machine is supported for travel on the ground by the rear supporting-wheel or caster 18. The rear supporting-wheel or caster 18 is journaled in a self-adjusting bearing-yoke 19, that is pivotally mounted on the lower end of a supporting shank or standard 20, that is adjustably bolted at its upper end at one side and the center of the rear transverse frame-bar 3 by means of the clip-bolt 21, which thereby provides means for vertically adjusting the supporting shank or standard 20 to assist in regulating or gaging the depth of penetration of the plows of the machine. The said supporting shank or standard 20 also has connected to the lower end thereof one end of a plate-arm 22, to which is detachably connected the rear hook end of a brace-rod 23, the front hook end of which is detachably connected to a similar plate-arm 22ª, that is preferably bolted to the center and under side of the front of the transverse frame-bar 2 by means of the bolt 24, which secures to said bar 2 the lower end of the rearwardly-extending seat-arm 25, carrying the driver's seat 26, that is located centrally between the opposite pairs of side bars or beams 1.

At a point intermediate of their front and rear ends each pair of the opposite side bars or beams 1 is designed to support thereon an ordinary seed-hopper 27, which is designed to drop the seed either by gravity or through the medium of any feed mechanism, and arranged directly under the hoppers, on the pairs of side bars or beams 1, are the adjustable shovel-standards 28. The adjustable shovel-standards 28 carry at their lower ends furrow-opening shovels 29, that provide for opening up the furrow to receive the seed that falls from the hoppers through the seed-tubes 30, that are secured to the rear sides of the shovel-standards 28 and are located directly below the discharge-openings of the seed-hoppers 27 to provide for guiding the seed into the furrow in rear of the opening-shovels 29. The said adjustable shovel-standards 28, which carry the seed-tubes, are provided at their upper ends with the pivot-arms 31, that are arranged to work between the bars or beams 1 of each pair and are pivotally mounted on the transverse pivot-rods 32, that connect the side bars or beams 1 of each pair at an intermediate point.

Arranged in rear of each of the adjustable shovel-standards 28 is a pair of adjustable disk-carrying standards 33. The disk-carrying standards 33 are connected together and braced apart at an intermediate point by a transverse connecting-rod 34 and are pivotally connected at their upper ends, as at 35, to one side of the side bars or beams 1, at the extreme rear ends thereof. The pivoted disk-carrying standards 33 are provided with lower angled ends 36, on which are journaled covering-disks 37. The covering-disks 37 of each pair are convergently disposed with respect to each other to provide for covering up the furrow made by the opening-shovel immediately in advance thereof. Each of the disk-carrying standards 33 has pivotally connected thereto one end of a pivoted connecting-link 38, the other end of which is adapted to receive a removable key 39, passed through any of a series of perforations 40 in the inner end of an adjusting bar or rod 41, the other front end of which is pivotally connected, as at 42, to a sliding cross-head 43, that is mounted to slide on the side bars or beams 1, in front of the hopper thereon.

There is a pair of the adjusting bars or rods 41 for each pair of the disk-carrying standards 33, and the adjustable connection between the rear ends of said adjusting bars or rods and the connecting-links 38 provides means for varying or gaging the depth of penetration of the covering-disks. A simultaneous and corresponding adjustment is given to the shovel-standards 28 through the medium of adjusting bars or rods 43ª, that are pivotally connected at their upper front ends at 42 to the sliding cross-heads 43, and at their lower rear ends the said adjusting bars or rods 43ª are provided with a series of key-openings 44 to receive the keys or pins 45, that engage in perforations in the shovel-standards 28 to provide for pivotally and adjustably connecting the lower rear ends of the bars or rods 43ª to said shovel-standards.

The sliding cross-heads 43, that are arranged on each pair of the side bars or beams 1, have their opposite ends sliding under inverted-U-shaped guide-plates 46, attached to the upper sides of the side bars or beams 1 near their front ends. The said sliding cross-heads have pivotally connected to the front sides thereof at 47 the rear ends of a pair of connecting-links 48, and each pair of the links 48 is pivotally connected to an adjusting-lever 49. The adjusting-levers 49, that are arranged in front of the sliding cross-heads 43, are pivotally mounted at their lower ends at one side of the front extension-bars 5, that are adjustably connected to the bars 2 and 8, and said levers are provided with suitable hand-operated catches 50, that are adapted to engage the teeth of toothed segments 51, that are bolted at their ends on top of the front extension-bars 5 by means of the bolts 6 and 7.

By reason of the construction herein described it will be obvious, without further description, that the machine may be readily adjusted to simultaneously plant two rows at any desired distance apart, and can also be readily adjusted to vary the depth of penetration of the opening-shovels and the covering-disks and also for raising and lowering these parts of the machine in and out of operative position, and in order to provide for simultaneously marking out the third row to be planted at the sides of the machine adjustable marker-arms 52 are pivotally bolted at their inner ends, as at 53, to the opposite extremities of the front transverse frame-bar 2.

The adjustable marker-arms 52 are provided at their outer ends with the bifurcated portion 54, in which are mounted vertically-disposed pins or bolts 55, on which loosely turn and move the bearing-collars 56 at the upper ends of bearing-yokes 57, in which are journaled suitable marking-wheels 58, that adjust themselves automatically to the line of draft. Springs 59 are arranged on the pins or bolts 55, above the bearing-collars 56, to normally hold the same on the lower sides of the bifurcated portions 54 of the marker-arms, while at the same time allowing the bearing-yokes 57 to readily adjust themselves vertically, so as to freely travel over rough ground.

The adjustable marker-arms 52 are also provided near their outer ends with a series of adjustment-perforations 60, that are adapted to be engaged by one of the angled ends 61 of adjusting-rods 62, the other angled ends of which are adapted to be engaged either in perforations 63 at the opposite ends of the front draft-bar 8 or in the perforations 64 in the opposite ends of the rear transverse frame-bar 3. By engaging one end of the adjusting-rod 62 in one of the perforations of the marker-arms and the other ends of said rods in the perforations at the ends of the front draft-bar 8 the marking-wheels may be held in operative position at any distance from the sides of the machine, and by shifting the engagement of one end of the rods 62 from the bar 8 to the bar 3, as illustrated in Fig. 1 of the drawings, the marking-wheels can be adjusted to inoperative positions, so as to travel in the middle of a row.

Changes in the form, proportion, and the minor details of construction may be resorted to without departing from the principle or sacrificing any of the advantages of this invention.

Having thus described the invention, what is claimed, and desired to be secured by Letters Patent, is—

1. In a machine of the class described, the combination of the frame having front and rear transverse frame-bars, front wheels supported below the frame, at opposite front sides thereof, a depending supporting shank or standard adjustably attached at its upper end to the rear transverse frame-bar at the center thereof, a wheel-carrying yoke pivotally mounted on the lower extremity of said shank or standard, oppositely-located perforated plate-arms respectively arranged at the under side of the front transverse frame-bar, and on said shank or standard directly above said yoke, a brace-rod having hook ends respectively detachably connected to said opposite plate-arms, a seat-supporting arm having its lower end arranged on the upper side of the front transverse frame-bar, and a single bolt fitted in the front transverse frame-bar and securing the seat-supporting arm and the front plate-arm thereto, substantially as set forth.

2. In a machine of the class described, the frame provided with front and rear transverse bars having perforations in its opposite ends, adjustable marker-arms pivotally connected at their inner ends to the sides of the frame intermediate of said front and rear transverse bars and carrying at their outer ends marking-wheels, and adjusting-rods adjustably connected at one end with said marker-arms and adapted to have their other ends engage with the perforations of either the front or rear transverse bars of the frame, substantially as set forth.

3. In a machine of the class described, the combination of the planter-frame provided with front and rear transverse bars having perforations in their opposite ends, adjustable marker-arms pivotally connected at their inner ends to the sides of the frame at a point intermediate of said front and rear transverse bars and provided with outer bifurcated ends, vertically-disposed pins or bolts fitted in the bifurcated ends of the marker-arms, self-adjusting bearing-yokes carrying marking-wheels, and provided with bearing-collars loosely engaging said pins or bolts, springs arranged on the pins or bolts above said collars, and adjusting-rods having angled ends, said adjusting-rods being adapted to be adjustably engaged at one end with the marker-arms and at their other ends with the perforations of either of the front or rear transverse bars of the planter-frame, substantially as set forth.

In testimony that I claim the foregoing as my own I have hereto affixed my signature in the presence of two witnesses.

STEPHEN J. ADKINS.

Witnesses:
A. W. KERR,
S. B. ELLIOTT, Jr.